United States Patent [19]

Farr

[11] 4,428,624
[45] Jan. 31, 1984

[54] ANTI-SKID BRAKING SYSTEMS FOR VEHICLES

[75] Inventor: Glyn P. R. Farr, Warwickshire, England

[73] Assignee: Lucas Industries Limited, Birmingham, England

[21] Appl. No.: 337,757

[22] Filed: Jan. 7, 1982

[30] Foreign Application Priority Data

Jan. 14, 1981 [GB] United Kingdom ................ 8101108
May 12, 1981 [GB] United Kingdom ................ 8114404

[51] Int. Cl.³ .............................................. B60T 8/02
[52] U.S. Cl. ..................................... 303/116; 303/10
[58] Field of Search ............... 188/181 A; 303/10, 11, 303/61, 115, 116, 119

[56] References Cited

U.S. PATENT DOCUMENTS 4,350,396 9/1982 Mortimer ........................... 303/115
4,381,125 4/1983 Wilson ............................... 303/116

*Primary Examiner*—Duane A. Reger
*Attorney, Agent, or Firm*—Scrivener, Clarke, Scrivener and Johnson

[57] ABSTRACT

An anti-skid braking for a vehicle comprises a wheel having an hydraulic brake applicable by supplying thereto fluid under pressure from a master cylinder, a sensor to sense the presence of skid conditions at the wheel during braking and thereupon to produce a skid signal, a dump valve operative to cause fluid to be displaced from the brake in response to a skid signal so as to relieve the brake pressure, and a flow-control regulator valve arranged to regulate flow of fluid to the brake so as to re-apply the brake pressure at a controlled rate. The flow-control valve comprises a first restriction of predetermined size connected in series with a second restrictor defined between two relatively movable members and located upstream of the first restriction. The first restriction is defined at least in part by the member of which that member is biassed by a valve spring against the action of the pressure difference across the first restriction. Fluid is exhausted by the dump valve in response to the skid signal into a dump chamber and that fluid is adapted to displace an expander piston in a direction to increase the biassing effect of the valve spring whereby to increase the rate of flow of fluid through the regulator valve, and a scavenger pump is arranged to withdraw fluid from the dump chamber and return it to the master cylinder on the said upstream side of the second restrictor.

14 Claims, 2 Drawing Figures

ANTI-SKID BRAKING SYSTEMS FOR VEHICLES

SPECIFIC DESCRIPTION

This invention relates to anti-skid hydraulic braking systems for vehicles of the kind which include a modulator which, in response to a skid signal at a skid point from means to sense the presence of skid conditions of the wheel during braking, is operative to relieve the brake-applying pressure at a braked wheel by releasing fluid from the brake.

Known anti-skid hydraulic systems of the kind set forth incorporate an hydraulic pump which is operative to provide a power source for re-applying the brake at the termination of the skid. The pump may be operative to re-apply the brake indirectly, for example by acting to move an hydraulic piston in a brake-applying direction to re-pressurise a volume of fluid trapped between an isolating valve downstream of a master cylinder, and the brakes.

Such systems have the advantage that a pump may also be used for other systems, for example power steering, but the disadvantage that in view of the isolating valve some means must be provided to enable at least partial brake re-application in the event of failure of a circuit containing pump.

In our GB Patent Application No. 2,045,372 we have disclosed an anti-skid hydraulic braking system for vehicles comprising a wheel having a hydraulic brake applicable by supplying thereto fluid under pressure, means to sense the presence of skid conditions at the wheel during braking and thereupon to produce a skid signal, means to isolate the brake from its fluid supply and displace fluid from the brake in response to a skid signal so as to relieve the brake pressure, and a regulator arranged to regulate flow of fluid to the brake on cessation of the skid signal so as to re-apply the brake pressure at a controlled rate, the regulator comprising a first restriction of predetermined size connected in series with a second restriction defined between two relatively movable members being controlled by the difference in fluid pressure across the first restriction such that an increase in this pressure difference causes a reduction in the size of the second restriction.

In operation the system of GB Patent Application No. 2,045,372, at the termination of the skid signal, provides the regulator with a constant rate at which fluid pressure is re-applied automatically to the brake during a common braking cycle, irrespective of the magnitude of the applied fluid under pressure. It has been found that a constant re-apply rate is disadvantageous under certain circumstances, and that a variable re-apply rate would be of advantage if such a variable re-apply rate could still be independent of the applied pressure. For example, if a vehicle which is being braked on a dry road runs over a patch of low friction, for example a patch of ice, the time for which the skid signal will be operative will be very small as the wheel is accelerated by the dry surface. The brake-applying pressure, however, will have fallen to its lowest value to prevent a skid on the patch of ice. Therefore the constant rate of re-application may delay the reestablishment of brake pressure which existed prior to the skid for an interval of time longer than is appropriate having regard to the type of surface over which the vehicle is travelling after the skid had been corrected. Ideally therefore the brake should be re-applied as rapidly as possible, appropriate to the nature of the surface over which the vehicle is then travelling.

GB Patent Specification No. 1,424,198 discloses an anti-skid hydraulic braking system having a variable rate of automatic re-application of fluid pressure to the brake after a skid has been corrected. This is achieved by applying fluid to the brake through a flow control valve which includes a set value forming a variable orifice biassed towards an open or position of maximum flow by a spring, and an orifice of fixed area disposed upstream of the variable orifice. The biassing effect of the spring is varied in accordance with the pressure of hydraulic fluid in a dump chamber which acts on the spring through a piston in a direction to reduce the biassing effect of the spring as the displacement of the piston is increased, and this displacement of the piston in the dump chamber is dependent upon the volume of hydraulic fluid applied to the brake at the skid point and which is reduced progressively by a scavenging pump operative to return fluid to brake-applying means, suitably a pedal-operated master cylinder, from the dump chamber at least while the skid signal is operative. Thus the rate of flow of fluid through the valve to the brake has a value which is determined by the spring and the cross-sectional area of the fixed orifice, and the rate at which pressure can be re-applied to the brake following cessation of the skid signal is determined by the final position of the piston at the cessation of the skid signal. In the construction described in GB Patent Specification No. 1,424,198 the fixed orifice provides communication between opposite sides of a flow-measuring piston to provide a pressure drop thereby subjecting the flow-measuring piston to a net force acting in opposition to the force exerted by the spring and, when the pressure drop is sufficient, the piston tends to engage a valve seating to restrict the flow past the piston to the brake. As the flow rate lessens in response to this restriction, the pressure drop is reduced, and the spring tends to urge the flow-measuring piston in the opposite direction until a state of equilibrium is reached.

In a panic brake-applying situation the pressure drop across the piston will be considerable and the piston will tend to be urged into engagement with the valve seating to isolate the master cylinder from the brake. This may prevent the brake from being applied and the pressure from the master cylinder will act to hold the piston against the seating since a lower pressure is present downstream of the valve seating than is present upstream of the seating.

The characteristics of the system of GB Patent Specification No. 1,424,198 are such that, when controlling skids which occur at high brake pressure, such as when encountering a stretch of ice upon an otherwise dry road, the flow through the valve is reduced in response to the displacement of the piston. Since the scavenging pump is driven from the wheel, the effective pumping action is minimal until the wheel has recovered from the skid. This means that when the skid signal is cancelled, the initial rate of brake re-application is slow, but increases as the continued pumping action permits the piston to return towards its original position.

Conversely, when operating at low pressure, such as when driving on an icy road, the amount of fluid dumped from the brake is much less, and hence the initial rate of re-application will be relatively higher.

According to our invention in an anti-skid braking system for a vehicle comprising a wheel having an hydraulic brake applicable by supplying thereto fluid under pressure from a supply of brake-applying fluid, means to sense the presence of skid conditions at the wheel during braking and thereupon to produce a skid signal, a dump valve operative to cause fluid to be displaced from the brake in response to a skid signal so as to relieve the brake pressure, and a flow-control regulator valve arranged to regulate flow of fluid to the brake so as to re-apply the brake pressure at a controlled rate, the flow-control valve being biassed by a valve spring, fluid exhausted by the dump valve in response to the skid signal is adapted to displace an expander piston in a direction to increase the biassing effect of the valve spring whereby to increase the rate of flow of fluid through the regulator valve, and a power source is operative to cause fluid displaced from the brake to be returned to the supply on the upstream side of the flow control regulator valve.

The characteristics of our system are therefore substantially different from those which the known system described above is seeking to achieve.

Conveniently the dump valve is operative to cause fluid to be displaced from the brake into a dump chamber so that such fluid can then displace the expander piston in the said direction to increase the biassing effect of the valve spring, and the power source comprises a scavenger pump which is operative at least when the skid signal is operative to withdraw fluid from the dump chamber and return it to the supply on the said upstream side of the second restrictor.

It follows therefore that the rate of flow through the regulator valve at the cessation of the skid signal will depend upon the biassing effect of the valve spring which, in turn, depends upon the position of the expander piston in the dump chamber. If the pump output from the expander chamber is greater than the flow into it from the brake, while the dump valve is open, the expander piston will return towards its original position and the spring load, and hence the flow rate, will decrease. When the dump valve closes again at the cessation of the skid signal the brake will be re-applied at a rate determined by the position of the expander piston in the dump chamber.

The rate at which the brake can be re-applied at the cessation of the skid signal is determined by two features, namely:

1. The length of time between the dump valve opening and closing; and
2. The volume of fluid withdrawn from the brake.

I arrange for the pump to continue to run for a time following closure of the dump valve until the expander piston has returned to its stop. This allows the expander piston to continue to move in a direction to reduce further the biassing effect of the valve spring with the result that the rate at which the brake is re-applied reduces towards the end of the re-applying sequence.

For example, if the vehicle is on a very slippery surface the brake-applying pressure will be low when a skid signal is received, so that the expander piston will only move a relatively small distance to accommodate the small volume of fluid dumped from the brake and, as the wheel acceleration will be slow, the dump valve will remain open for a relatively long period during which the scavenger pump will have returned most of the dumped fluid to the supply on the upstream side of the restrictor. When the dump valve closes the expander piston will have almost returned to its original position so that the load in the biassing spring will be relatively low and hence the re-apply rate will be slow.

Should the vehicle pass from a high friction surface to a low friction surface the pressure applied to the brake will initially be high when the skid signal is received. Thus the expander piston will be caused to travel substantially the full extent of its stroke in order to accommodate the larger volume of fluid dumped from the brake. Since the skid will have been relatively severe involving of substantially drop in wheel rotational speed, and as the wheel acceleration will again be slow the expander piston will have almost returned to its original position by the time the dump valve closes so that, again, the re-apply rate will be slow.

A high-low-high friction surface transition will again cause the expander piston to move almost the full stroke but, because the wheel has passed onto the high friction surface, the wheel acceleration will be rapid so that the brake re-application is initially fast followed by a progressively reducing rate as the expander piston moves back.

On a surface of high coefficient of friction the expander piston only needs to move a small distance to reduce the brake pressure slightly before the wheel accelerates and so the brake re-application rate is slower.

Thus our invention enables us to take advantage of any change in the quality of the surface over which the vehicle is travelling at the cessation of the skid signal.

If the pump is driven by an electric motor a position sensing switch may be incorporated to switch off the motor when the expander piston has returned to its original position. Alternatively the pump may be operated from a shaft driven by the prime mover or a road wheel(s) of the vehicle. In any case pumping will cease automatically when the piston has returned to its original position in which no further fluid is present in the dump chamber. When the pump is driven by a variable speed power supply, a flow control device is preferably associated with the pump to provide a substantially constant pumping rate.

Preferably the flow-control valve regulator comprises a first restriction of predetermined size connected in series with a second restrictor defined between two relatively movable members and located upstream of the first restriction, relative movement of the members being controlled by the difference in fluid pressure across the first restriction such that an increase in this pressure difference tends to cause a reduction in the size of the second restriction, and the first restriction being defined at least in part by one of the relatively movable members of which that member is biassed by the valve spring against the action of the pressure difference across the first restriction.

Preferably the second restriction is located upstream of the first restriction.

Conveniently a seating is provided in the said one movable member and a valve head, which is normally spaced from the seating, is engagable with the seating at the skid point, in response to the biassing effect of the spring, the first restriction comprising a limited flow-path between the head and the seating when the head is in engagement with the seating, and the biassing force opposing the pressure difference across the first restriction being transmitted to the said one movable member through the valve head which acts as a force-transmitting strut.

During normal braking when the head is spaced from the seating an unrestricted flow path for fluid is provided between the master cylinder and the brake, through the open flow-control regulator valve, and the expander piston is held in a fully retracted position in which the volume of the dump chamber is at a minimum by means of a second return spring which surrounds the valve spring and acts between the piston and a relatively stationary part. The pressure to which the dump chamber must be subjected before the expander piston will move in a direction to urge the head into engagement with the seating is therefore determined by the pre-load of the second return spring. When the head is urged away from its seating by means of a light spring the pressure at which the expander piston will start to move is determined by the combined pre-load of the second return spring, and the light spring.

Providing the first restriction between the seating and a valve head which is spaced from the seating at least in the "off" position of the brake ensures that in an initial and/or panic brake-applying situation full and unrestricted fluid pressure from the supply can be supplied to the brake and there is no way in which this supply can be restricted unless and until a skid point is reached.

After closure of the dump valve and the first restriction becoming operative, the pressure difference across the first restriction prevents the head from moving away from the seating to re-establish unrestricted communication between the supply and the brake, irrespective of the position of the expander piston within its bore, until the pressure in the brake is substantially equal to that in the master cylinder. This is achieved by making the seating movable with the head so that the pressure difference acts to enhance the force of engagement between the head and the seating.

One embodiment of our invention is illustrated in the accompanying drawings in which.

Figure 1:
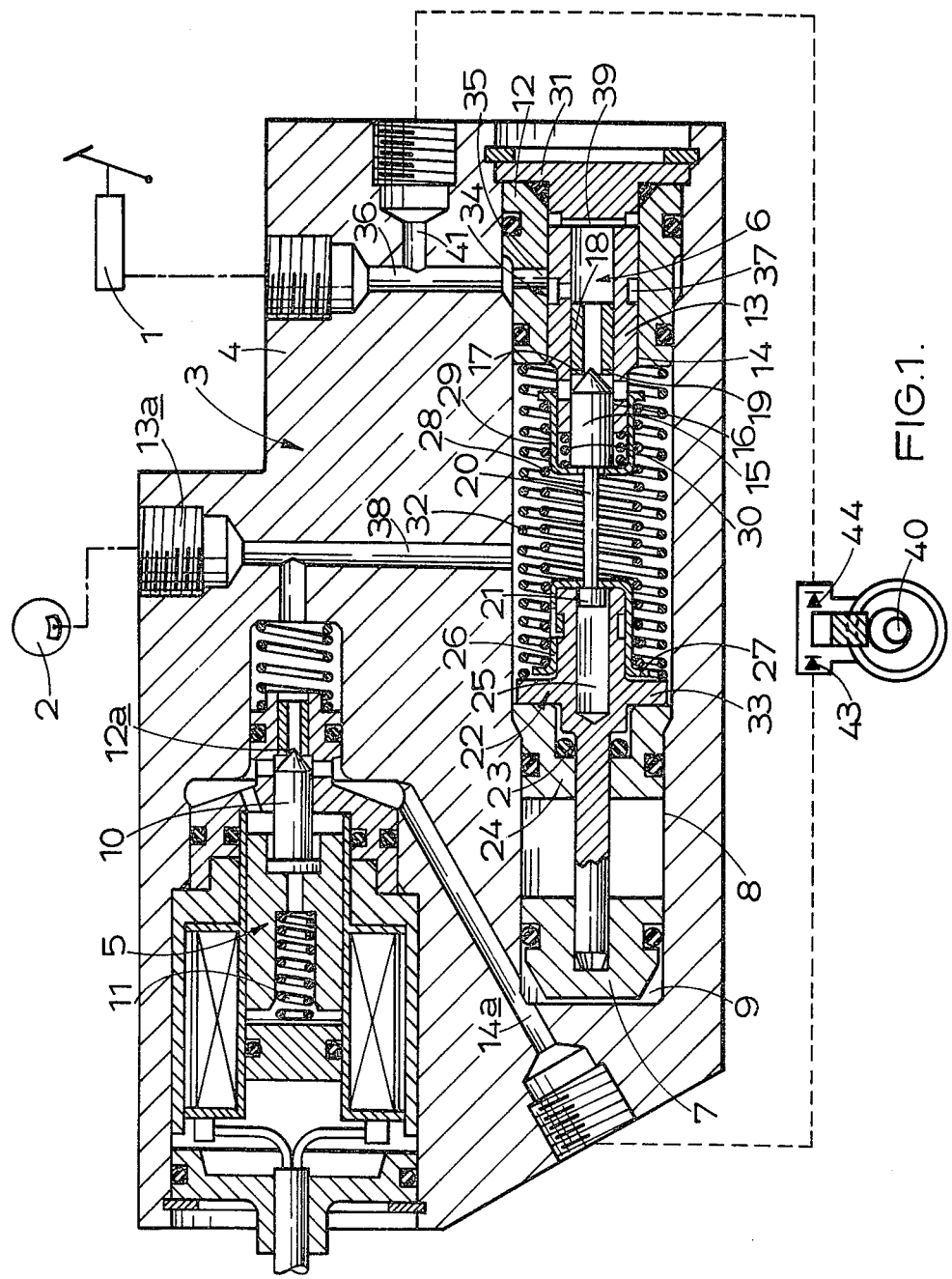
FIG. 1 is a layout of an anti-skid hydraulic braking system of a vehicle.

The anti-skid hydraulic braking system illustrated in FIG. 1 of the drawings comprises a pedal-operated hydraulic master cylinder 1 for operating a wheel brake 2, and fluid under pressure from the master cylinder 1 is supplied to the brake 2 through a modulator 3.

The modulator 3 comprises a housing 4 in which a solenoid-operated pressure dump valve 5, a flow-control regulator valve 6, and an expander piston 7 working in a bore portion 8 which defines a dump chamber 9.

The dump valve 5 comprises a valve head 10 which is normally urged by a spring 11 into engagement with a seating 12a in order to cut-off communication between an outlet port 13a connected to the brake 2 and a dump passage 14a which leads to the dump chamber 9.

The valve 6 is housed in one end of a stepped longitudinally extending bore 11 in the housing 4 of which the opposite end, which is of smallest diameter, defines the bore portion 8 which forms the dump chamber 9. The valve 6 comprises a sleeve 12 of differential outline of which the two portions are sealingly housed in the portions of bore 11 which are of greatest and of intermediate diameter, a hollow spool 13 working in the bore 14 of the sleeve 12, and a valve head 15 of cone-shaped outline slidably guided in the bore 16 of the spool 13 for engagement with a seating 17 defined by the adjacent end of a member 18 which is housed in the bore 16. The seating 17 is provided with a diametrical scratch or slight notch 19 which defines between the head 15 and the seating 17 a first restriction of fixed area when the head 15 is in engagement with the seating 17. The head 15 is carried at one end of a stem 20 of reduced diameter of which the opposite end carries an enlarged head 21.

A force-transmitting member 22 is guided to slide through a seal 23 in a partition 24 which is received in the portion 8 of the bore 11 which is of smallest diameter. The expander piston 7 acts on one end of the member 22 and the opposite end disposed in the opposite side of the partition 24 is provided with a longitudinally extending bore 25 in which the head 21 is slidably received. The head 21 is retained within the bore 25 by means of a retainer 26 of top-hat outline. A flange 27 on the retainer forms an abutment for one end of a compression spring 28 which surrounds the stem 20 and of which the opposite end is in abutment with a thimble 29 which, in turn, abuts against the adjacent end of the head 15. A light spring 30 is positioned between the spool 13 and the thimble 29 to urge the spool 13 against a stop 31 at the adjacent end of the bore 11. A further compression spring 32 acts between the sleeve 12, and a radial flange 33 on the force-transmitting member 22. The spring 32 acts to hold the sleeve 12 against the stop 31 at the end of the bore 11 and, in conjunction with the forces in the springs 28 and 30, act to urge the flange 33 into engagement with the partition 24, in turn to define a retracted position for the expander piston 7 in which the volume of the dump chamber 9 is at a minimum. The relative lengths of the stem 20 and the head 15 are chosen such that, in this inoperative retracted position shown, the head 15 is spaced from the seating 17.

A second restriction 34 of variable area is defined in the valve 6 by a radial port 35 in the sleeve 12 which is in permanent communication with the master cylinder 1 through a passage 36 in the housing 4 and an annular recess 37 in the spool 13 which meters flow through the port 35 and into a radial port in the spool 13 in accordance with the position of the spool 13 within the bore of the sleeve 12. In the restricted position shown the restriction 34 is in a maximum open position to permit an unrestricted flow of fluid from the master cylinder 1 to the outlet port 13, through the unrestricted space between the head 15 and the seating 17 and through the intermediate portion of the bore 11 and a communicating passage 38 in the housing 4. The stop 31 is provided with a diametrical or other slot 39 to enable fluid pressure within the bore of the spool 13 to act on the end of the spool 13 which is of greatest area.

A scavenger pump 40 is connected between the end of the dump passage 14 which is remote from the dump valve 5 and a recirculation passage 41 which opens into a brake-line comprising the passage 36 between the master cylinder 1 and the port 35. When the pump 40 is operating it is operative to withdraw fluid from the dump chamber 9 and pump it to the passage 36 on the upstream side of the valve 6.

The pump 40 is provided on its suction and delivery sides with oppositely acting one-way valves 43 and 44 respectively.

In a normal inoperative brake-applying position all the components are disposed in the relative positions shown in the drawing with the solenoid-operated valve closed, and the flow-control regulator valve 6 and the pump 40 both inoperative.

Upon operation of the master cylinder 1 the brake 2 is applied by the supply of hydraulic fluid under pressure through the brake-line 36 and the valve 6 to the outlet port 13 as described above. In this condition the valve 6 is inoperative. Reverse-flow through the recirculation passage 41 is prevented by the one-way valve 44.

The wheel braked by the brake 2 is provided with skid sensing means which, at a skid point at which a skid occurs at the braked wheel, is operative to generate a skid signal to energise the solenoid of the solenoid-operated valve 5 in order to withdraw the head 10 from the seating 12a. Fluid supplied to the brake 2 is dumped to the dump chamber 9 and acts on the expander piston 7. When the pressure of the fluid is sufficient to overcome the loading in the springs 30 and 32 the piston 7 moves inwardly of the bore 11 to increase the effective volume of the dump chamber 9 thereby to relieve the pressure applied to the brake 2. Initial movement of the piston 7 in this inward direction causes the head 15 to engage with its seating 17 such that the slot 19 defines the first restriction of fixed area. Thereafter further movement of the piston 7 against the combined loading of the springs 28 and 32 has the effect of increasing the load of the spring 28 which determines the force with which the spool 13 is urged into engagement with, or towards, the stop 31.

Since the master cylinder 1 is still being operated some fluid will flow directly from the master cylinder 1 to the dump chamber 9 when the dump valve 5 opens but, upon engagement of the head 15 with the seating 17 to define the first restriction, a pressure drop occurs across the first restriction. Thus the spool 13 is subjected to a net force which is operative to tend to urge the spool 13 away from the stop 31 in order to reduce the effective area of the second restriction and, in turn, to regulate the rate of flow through the valve 6 to a predetermined constant value for a given loading of the spring 28. In other words the spool 13 adopts an equilibrium position in which the resultant force acting on the spool 13 to urge it away from the stop 31 is balanced by the force in the spring 28.

At the same time as the solenoid is first energised the scavenger pump 40 starts to operate. The scavenger pump 40 can be driven electrically by an electric motor, or it can be provided with a disabler of which the effect is overcome by the pressure of fluid in the dump chamber 9 which acts to cause a pump plunger of the pump 40 to co-operate with a rotating eccentric drive. In the latter construction, the drive can be driven continuously, for example from the crank-shaft of the prime mover of the vehicle.

The scavenger pump 40 returns fluid from the dump chamber 9 to the brake-line 36 through the connection 41.

The output of the pump 40 exceeds the flow through the flow-regulator valve 6. Thus once the dump chamber 9 has absorbed the volume of fluid returned from the brake, the expander piston 7 will start to move back to its original retracted position in which the volume of the dump chamber 9 is at a minimum. Whether or not the expander piston 7 reaches the fully retracted position before the dump valve 5 closes to isolate the brake 2 from the dump chamber 9 will depend upon the duration of the skid signal. The position of the expander piston 7, when the dump valve 5 closes determines the loading of the spring 28, the rate of flow through the valve 6, and hence the rate at which the brake 2 can be re-applied. However, I also arrange for the pump 40 to continue to run for a predetermined interval following closure of the valve 5 for the purpose to be described later.

The initial rate at which the brake will be re-applied automatically in a single cycle and following correction of a skid is determined by:

1. The length of time between the dump valve 5 opening and closing; and
2. The volume of fluid withdrawn from the brake 2.

On a surface having a relatively high coefficient of friction a high brake pressure can be developed during normal braking, and a large amount of strain energy is stored in the brake housing. The relief of such energy in response to the skid signal acts to augment the capacity of the dump chamber 9 and, due to the relatively high master cylinder pressure having to be relieved, the expander piston 7 is moved a considerable distance down the bore 11 when the dump valve 5 opens. This applies a high pre-load to the spring 28, in turn to provide the valve 6 with a correspondingly high flow rate setting. Assuming therefore that the skid signal is of short duration and the pump 40 has withdrawn only a relatively small volume of fluid from the dump chamber 9 then, at the cessation of the skid signal, the pre-load in the spring 28 is substantially the same and the high flow rate setting of the valve 6 will cause the brake pressure to build up again relatively quickly. But since the pump 40 is still operating to withdraw fluid from the dump chamber 9 after the valve 5 has closed, the pre-load in the spring 28 is gradually reduced during such re-application. This reduces the flow rate setting of the valve 6 and reduces the rate of re-application of the brake 2, towards the end of the re-application stage until, finally, the effective volume of the chamber 9 is reduced to its minimum value which enables the valve head 15 to move away from the seating 19. This renders the valve 6 again inoperative so that the master cylinder is connected directly to the brake 2 without restriction.

The longer the delay between the valve 5 opening and closing, the greater will be the volume of fluid withdrawn from the chamber 9 and returned to the brake-line 42 in that period and the lower will be the loading in the spring 28 and hence the setting of the flow control valve 6. A long delay would be consistent with a surface having a low co-efficient of friction, and vice versa.

Conversely if the brake 2 is applied when the vehicle is on a surface having a relatively low coefficient of friction and a skid signal is received, the expander piston 8 moves only a relatively small distance to relieve the applied pressure and render the flow control valve 6 operative. Thus the flow control valve 6 will have a very low flow setting and, in consequence, the rate at which the brake can be re-applied in that cycle will be at its lowest.

When the pump 40 is driven electrically a position sensing switch is incorporated to switch off the pump motor after a predetermined time following closure of the dump valve 5.

As illustrated, when the pump 40 is operated from a shaft driven by the prime mover of wheel(s) of the vehicle, the pump will sense automatically when the expander piston 7 has returned to its original position in which no further fluid is present in the dump chamber 9. When the pump is driven from a variable speed power supply, a flow control device is preferably associated with the pump to provide a substantially constant output.

When the expander piston 7 has been returned to its fully retracted position before the dump valve closes, as may occur when a skid signal is produced with the brakes applied on an extremely slippery surface, the pressure between the passage 36 and the brake 2 acts to apply a net force to the spool 13 urging it away from the stop 31 and holding it against the head 15 to give the lowest rate of re-application. Since the pressure difference is maintained whilst the skid signal is operative, the head 15 is firmly held in engagement with the seating to define the first restriction under such conditions. A pressure difference of only two atmospheres is required to hold the head 15 against the seating 17.

Figure 2:
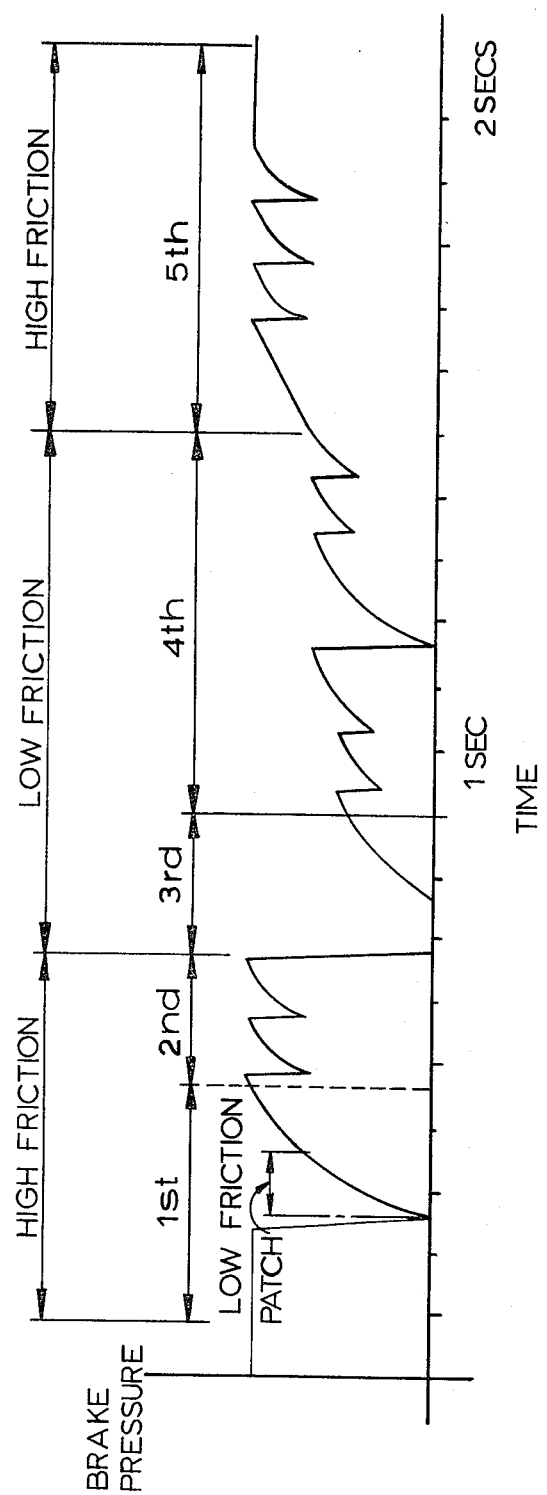
FIG. 2 is a graph of modulated brake pressures plotted against time.

FIG. 2 is a graph of brake pressure plotted against time.

As shown in the graph, the vehicle is initially braked on a dry road but passes over a low friction patch, e.g. a manhole cover, and then back onto a dry road. As the wheel re-acceleration is high on the dry road the dump valve 5 opens and closes quickly but the expander piston 7 has moved well into the bore 11 to ensure the brake 2 is relieved. The flow control valve 6 is, therefore, highly loaded by the spring 28 and the initial brake re-application rate is fast. However, as the pump 40 withdraws the fluid, the flow rate decreases as shown by the graph.

The second stage assumes the driver has increased the master cylinder pressure during the first stage so a series of skid signals are received on the dry surface. In this case the expander piston 7 only needs to move a small distance to reduce the brake pressure slightly before the wheel accelerates and so the brake re-application rate is slow.

The third stage assumes the vehicle passes onto a low friction surface and the brakes are fully relieved, driving the expander piston 7 fully towards the stop 31. However, as the road surface friction is low it takes some time for the wheel to accelerate and close the dump valve 6 so that the expander piston 7 has been allowed to return. When the dump valve 6 closes the brakes are re-applied slowly.

The fourth stage shows the re-apply on the slippery surface with re-apply at its slowest rate i.e. small movements of the expander piston 7, to release the brake and partial return due to slow wheel acceleration. The central dip shows another, more slippery, patch.

The fifth stage assumes that the vehicle passes once more onto a dry surface and in this case the first re-application will be slow. However, subsequent signals will be as shown in the second stage.

I claim:

1. An anti-skid braking system for a vehicle braking system comprising a wheel, an hydraulic brake for braking said wheel, a supply of brake-applying fluid for supplying fluid under pressure to said brake to apply said brake, means to sense the presence of skid conditions at said wheel during braking and thereupon to produce a skid signal, a dump valve operative to cause fluid to be displaced from said brake in response to a skid signal from said means so as to relieve the pressure of fluid supplied to said brake, a flow-control regulator valve arranged to regulate flow of fluid to said brake so as to re-apply said brake pressure at a controlled rate, a valve spring for biassing said flow-control valve, an expander piston for regulating the biassing effect of said valve spring and responsive to fluid exhausted by said dump valve in response to a skid signal, fluid exhausted by said dump valve being adapted to displace said expander piston in a direction to increase said biassing effect to said valve spring whereby to increase the rate of flow of fluid through said regulator valve, and a power source operative to cause fluid displaced from said brake to be returned to said supply of brake-applying fluid on the upstream side of said flow-control regulator valve.

2. A system as claimed in claim 1, including a dump chamber, wherein said dump valve is operative to cause fluid to be displaced from said brake into said dump chamber so that such fluid can then displace said expander piston in the said direction to increase said biassing effect of said valve spring, and said power source comprises a scavenger pump which is operative to withdraw fluid from said dump chamber and return said fluid to said supply on the said upstream regulator valve.

3. A system as claimed in claim 2, wherein the rate of flow through said regulator valve at the cessation of said skid signal depends upon said biassing effect of said valve spring which, in turn, depends upon the position of said expander piston in said dump chamber, and the pump output from said expander chamber is greater than the flow into said expander chamber from said brake whereby, while said dump valve is open, said expander piston is adapted to return towards an original position and the spring load, and hence the flow rate, decreases and, when the said dump valve closes again at the cessation of said skid signal, said brake is adapted to be re-applied to a rate determined by the position of said expander piston in said dump chamber.

4. A system as claimed in claim 3, wherein said pump is adapted to continue to run for a time following closure of said dump valve at the cessation of said skid signal whereby said expander piston is allowed to continue to move in a direction to reduce further said biassing effect of said valve spring with the result that the rate at which said brake is re-applied reduces towards the end of the reapplying sequence.

5. A system as claimed in claim 2, wherein said pump is adapted to withdraw fluid from said pump chamber at a substantially constant rate.

6. A system as claimed in claim 2, wherein said pump is driven by an electric motor and a position sensing switch is incorporated to switch off said motor when said expander piston has returned to its original position.

7. A system as claimed in claim 2, wherein said pump is operated from a shaft driven by the prime mover of the vehicle, whereby pumping ceases automatically when said piston has returned to its original position in which no further fluid is present in said dump chamber.

8. A system as claimed in claim 1, wherein said flow-control regulating valve comprises two relatively movable members, a first restriction of predetermined size, a second restrictor connected in series with said first restriction and defined between said two relatively movable members, relative movement of said members being controlled by the difference in fluid pressure across said first restriction such that an increase in said pressure difference is adapted to cause a reduction in the size of said second restriction, and said first restriction being defined at least in part by one of the said relatively movable members of which the said one member is biassed by said valve spring against the action of the pressure difference across said first restriction.

9. A system as claimed in claim 8, wherein said second restriction is located upstream of said first restriction.

10. A system as claimed in claim 8, wherein a seating is provided in the said one movable member and a valve head, which is normally spaced from said seating, is engageable with said seating at said skid point in response to the biassing effect of said spring, said first restriction comprising a limited flow-path between said head and said seating when the said head is in engagement with said seating, and said biassing force opposing said pressure difference across said first restriction being transmitted to the said one movable member through said valve head which acts as a force transmitting strut.

11. A system as claimed in claim 10, wherein a second return spring surrounds said valve spring and acts between said piston and a relatively stationary part and said head is spaced from said seating during normal braking to provide an unrestricted flow path for fluid between said supply and said brake, through said flow-control regulator valve which is open, and said expander piston is held in a fully retracted position in which the volume of said dump chamber is at a minimum by means of said valve spring and said second return spring, pre-load in said second return spring determining the pressure to which said dump chamber will move in a direction to urge said head into engagement with said seating.

12. A system as claimed in claim 10, wherein a light spring is adapted to urge said head away from said seating whereby the pressure at which said expander piston will start to move is determined by the combined pre-load of said return spring, and said light spring.

13. A system as claimed in claim 10, wherein said seating is movable with said head so that the pressure difference across said first restriction acts to enhance the force of engagement between said head and said seating.

14. A system as claimed in claims 8, wherein said second restriction comprises an annular recess in a spool, and a relatively fixed radial port with respect to which said spool is movable to control the effective area of said radial port and hence the rate of flow through said second restriction.

* * * * *